US010940446B2

(12) United States Patent
Massicotte

(10) Patent No.: US 10,940,446 B2
(45) Date of Patent: Mar. 9, 2021

(54) MULTI-RESERVOIR FEEDING APPARATUS

(71) Applicant: CAVADISTRIB. INC., Mirabel (CA)

(72) Inventor: René Massicotte, Mirabel (CA)

(73) Assignee: CAVADISTRIB. INC., St-Jérôme (CA)

(*) Notice: Subject to any disclaimer, the term of this patent is extended or adjusted under 35 U.S.C. 154(b) by 295 days.

(21) Appl. No.: 16/083,183

(22) PCT Filed: Mar. 8, 2017

(86) PCT No.: PCT/CA2017/050311
§ 371 (c)(1),
(2) Date: Sep. 7, 2018

(87) PCT Pub. No.: WO2017/152283
PCT Pub. Date: Sep. 14, 2017

(65) Prior Publication Data

US 2019/0070570 A1 Mar. 7, 2019

Related U.S. Application Data

(60) Provisional application No. 62/305,240, filed on Mar. 8, 2016.

(51) Int. Cl.

| | |
|---|---|
| ***B01F 1/00*** | (2006.01) |
| ***B01F 5/10*** | (2006.01) |
| ***B01F 15/02*** | (2006.01) |
| ***B01F 15/04*** | (2006.01) |
| ***G05D 11/00*** | (2006.01) |
| *B65G 65/46* | (2006.01) |

(52) U.S. Cl.
CPC ............ *B01F 1/0022* (2013.01); *B01F 5/106* (2013.01); *B01F 15/0251* (2013.01); *B01F 15/0408* (2013.01); *G05D 11/005* (2013.01); *B65G 65/46* (2013.01)

(58) Field of Classification Search
CPC .... B01F 1/0022; B01F 5/106; B01F 15/0251; B01F 15/0408; G05D 11/005; B65G 65/46
See application file for complete search history.

(56) References Cited

U.S. PATENT DOCUMENTS 8,573,829 B2 * 11/2013 Gordon .................. B01F 3/184 366/155.1
2014/0021224 A1 * 1/2014 Massicotte ........... G01F 13/005 222/333
2014/0054133 A1 * 2/2014 Hansen ..................... B65B 5/08 198/418.1

* cited by examiner

*Primary Examiner* — Anshu Bhatia
(74) *Attorney, Agent, or Firm* — Praxis

(57) ABSTRACT

A multi-reservoir feeding/dosing apparatus for the delivery of at least two substances in discrete form includes first and second conveying elements in which the discharge end thereof are a close fit in a discharge bushing thereby to ensure that the correct dosage of each substance is discharged on a consistent basis. Each conveying element is in its respective reservoir. At least one motor drives both conveying elements, with each rotational direction of the motor actuating a corresponding one of the conveying elements.

5 Claims, 4 Drawing Sheets

16
21
15
32a
32
18
2
3
51
51'
63
65
4
32'
22
2
3
32a

MULTI-RESERVOIR FEEDING APPARATUS

CROSS REFERENCE TO RELATED APPLICATIONS

This application claims the benefits of U.S. provisional application Ser. No. 62/305,240, filed on Mar. 8, 2016, which is incorporated herein by reference in its entirety.

FIELD OF THE INVENTION

The present invention relates to feeding apparatuses, and is more particularly concerned with such an apparatus having multiple reservoirs for automatically, or manually, dosing powder, or granular or other substances in discrete form.

BACKGROUND OF THE INVENTION

It is well known in the art to provide apparatus for the delivery of such materials as mentioned above at predetermined rates, namely in prescribed dosages, in for example the chemical or pharmaceutical industries where consistent accuracy is an important requirement for their processes.

Various types of dosing/feeding apparatus have been proposed and include inter alia those employing pocketed rotors, or screw feeders in either the vertical or horizontal orientations feeding particulate substances in granular, pulverulent or generally discrete form continuously or intermittently as demanded by the relevant processes.

One of the problems attendant upon the usage of conventional apparatus is in maintaining the accuracy requirement in view of the predisposition of the driving elements to become contaminated and in so doing to affect the quantitative performance of the apparatus on a temporal basis. Accordingly, the efficacy of the apparatus is compromised, as is the process for which it is being employed. Furthermore, in order to provide accurate dosage, one must ensure that there is always feeding substance flowing through the discharge outlet, with the space between the discharge opening and the conveying element is substantially entirely filled, with no void left because of too large particle that cannot enter the space.

This is especially important when dealing with the control of the acidity level of a fluid like water of a spa, swimming pool or the like, where the feeding substance is either one of an acid or a base, depending on the actual acidity level of the fluid to be treated relative to the targeted level. In addition to the accurate dosage of either substance that is required, the available space for the feeding apparatus is usually limited.

Accordingly, there is a need for an improved dosing/feeding apparatus.

SUMMARY OF THE INVENTION

It is therefore a general object of the present invention to provide an improved dosing/feeding apparatus.

An advantage of the present invention is that the dosing/feeding apparatus provides for consistency of delivery rates in the absence of any significant variation in quantity, for either substance.

Another advantage of the present invention is that the feeding apparatus is simple in construction and operation, with the control of either motor, or of the rotational direction of a motor connected to two conveying elements referring to respective reservoirs of feeding substances, such as acid and base substances.

A further advantage of the present invention is that the feeding apparatus has easily replaceable parts and its adjustment is facilitated thereby.

Still another advantage of the present invention is that the feeding apparatus provides for variations in the manner of dosage delivery.

Yet another advantage of the present invention is that the feeding apparatus is intended and capable of continuous operation, as 24 hours a day, 7 days a week.

Yet a further advantage of the present invention is that the feeding apparatus could be small in size so as to fit in tiny spaces.

According to the present invention, there is provided a multi-reservoir feeding/dosing apparatus for feeding at least first and second substances in discrete particulate form, the feeding apparatus comprising:

a first reservoir for receiving the first substance therein and having an inlet for the introduction of the first substance thereto and a first outlet for the egress of the first substance therefrom, a first conveying element having an inlet end and a discharge end, each end being mounted in a respective bushing and the first conveying element extending through the first reservoir and adapted to convey the first substance in predetermined dosages from the first reservoir to the first outlet thereof for delivery therefrom;

a second reservoir for receiving the second substance therein and having an inlet for the introduction of the second substance thereto and a second outlet for the egress of the second substance therefrom, a second conveying element having an inlet end and a discharge end, each end being mounted in a respective bushing and the second conveying element extending through the second reservoir and adapted to convey the second substance in predetermined dosages from the second reservoir to the second outlet thereof for delivery therefrom;

at least one motor operatively connected to the first and second conveying elements; and a controller unit operatively connecting to the at least one motor to drive the first and second conveying elements upon rotation into first and second rotational directions, respectively.

In one embodiment, the at least one motor operatively connects to the first and second conveying elements via a coupling mechanism.

Conveniently, the coupling mechanism includes respective first and second free wheel sprockets allowing operation of the first and second conveyor elements upon the at least one motor being operated into the first and second rotational directions, respectively.

Conveniently, the apparatus further includes a sensor unit connecting to the controller unit for sensing an actual parameter level of a fluid, and the first and second outlets being in fluid communication with the fluid, and wherein the controller unit, upon the actual parameter being smaller or larger than a predetermined parameter level, operates the at least one motor into the first and second rotational directions, respectively, for feeding of the first and second substances into the fluid.

Conveniently, the controller unit, depending on a difference between the actual and predetermined parameter levels, operates the at least one motor into the first or second rotational direction for a calculated time duration to ensure the predetermined dosage of the first or second substance into the fluid.

In one embodiment, the at least one motor includes first and second motors operating the first and second conveying elements, respectively.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein:

FIG. 4 is a schematic diagram of the embodiment of FIG. 1 used to control parameters of the water of a spa or the like.

DETAILED DESCRIPTION OF THE INVENTION

With reference to the annexed drawings the preferred embodiments of the present invention will be herein described for indicative purpose and by no means as of limitation with like numerals of reference being employed for like parts in differing embodiments of the invention or its details.

Figure 1:
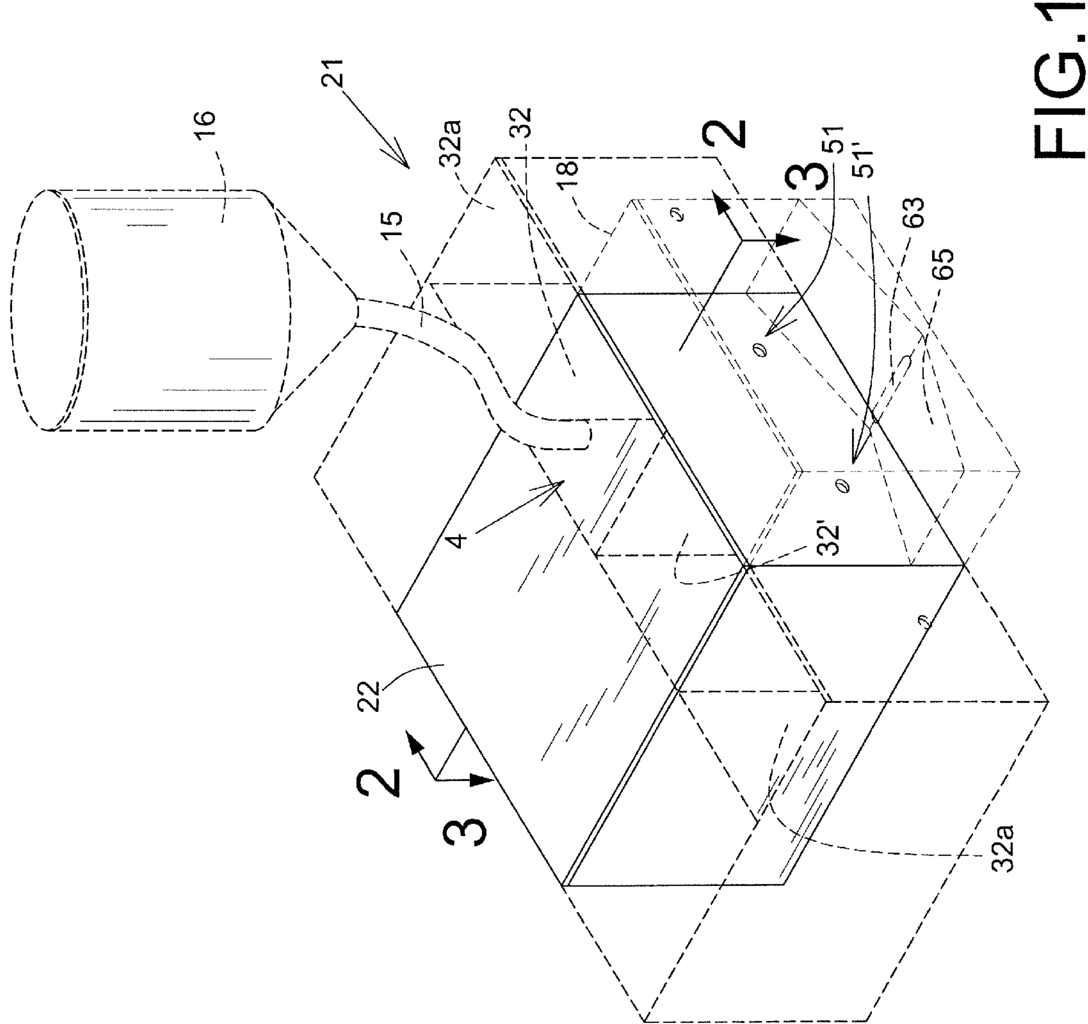
FIG. 1 is a simplified front perspective view of a multi-reservoir feeding/dosing apparatus in accordance with an embodiment of the present invention.

Referring first to FIG. 1, there is shown an exterior view of one embodiment of a multi-reservoir feeding/dosing apparatus 21 including a housing 22 encasing at least two reservoirs 32, 32', 32*a* with inlet conduits 14 fed through tubes 15 from elevated hoppers 16. A receptacle 18 is illustrated in ghosted outline and serves to receive dosed deliveries of at least two substances from the at least two reservoirs, the deliveries being effected by conveying elements (not shown) which engage bushings 51 in the outlets 40, 40' of the reservoirs 32, 32'.

Figure 2:
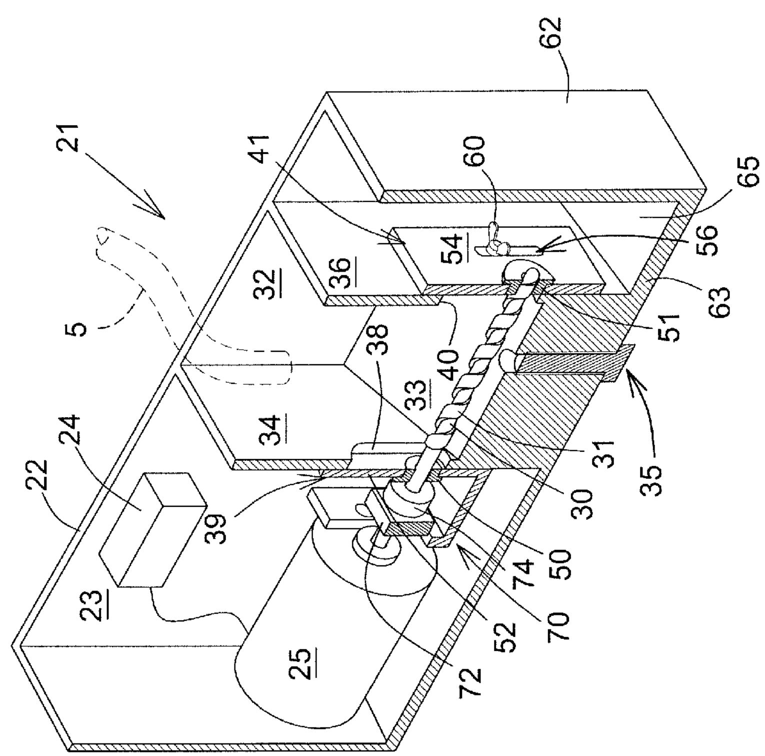
FIG. 2 is a sectioned top perspective view taken along line 2-2 of FIG. 1, showing the inside of the apparatus.
Figure 3:
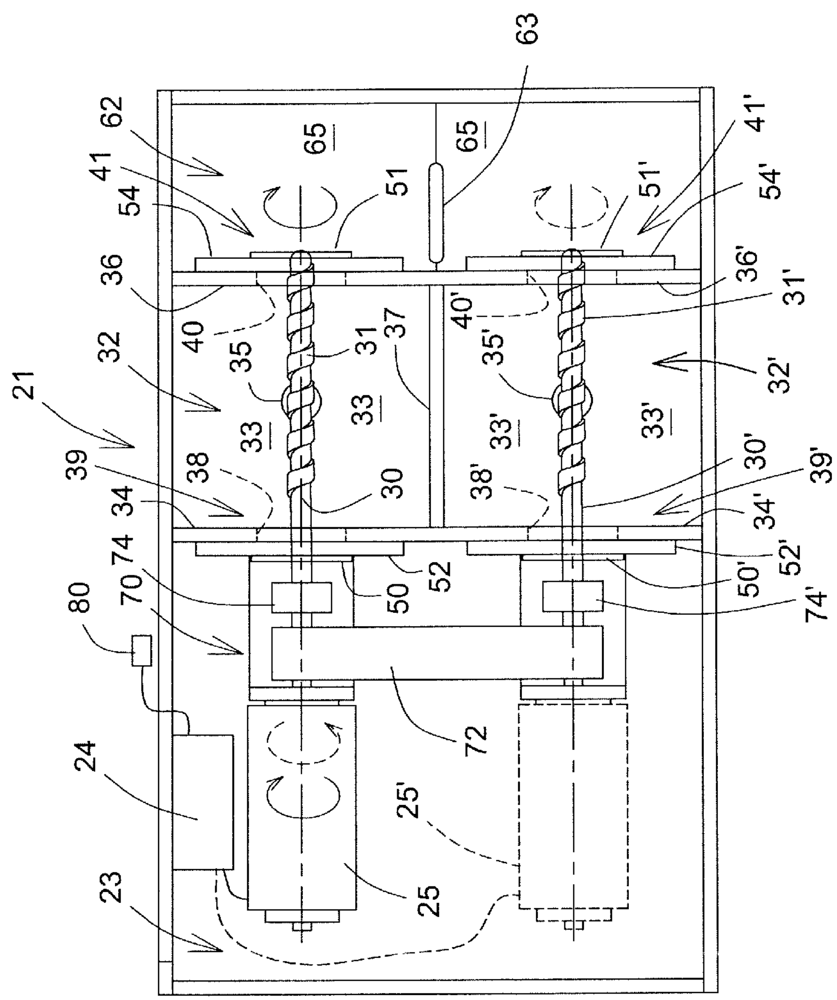
FIG. 3 is a sectioned plan view taken along line 3-3 of FIG. 1.

Turning now to FIGS. 2 and 3 the inside of the multi-reservoir feeding apparatus 21 is illustrated. A housing 22 defines a drive chamber 23 enclosing at least one motor 25 controlled in programmable fashion by a programmer or controller unit 24, such as using a potentiometer or the like. The motor 25 is coupled to and is adapted to drive at least a first conveying element 30, which extends through a first reservoir 32 at the relatively lower end thereof adjacent its sloping base 33, which is provided with a plugged drain 35. The first reservoir 32 is defined between two vertical compartmentalizing walls 34, 36 each of which is appropriately pierced as at 38, 40 respectively to provide a mounting zone 39, 41 for the first conveying element 30. The first conveying element 30 is held at each end thereof in a bushing 50, 51 providing a wiping seal to give a tight fit for the drive end and the discharge end of the element. The bushings 50, 51 are held in a mounting block 52, 54 respectively each of which is adjustable through the agency of a pin and slot arrangement 56 or the like securable in position by the application of pressure provided by wing-nuts 60 or the like. A receptacle 62 for the reception in use of dosages of a first substance delivered by the first conveying element 30 through the outlet bushing 51 is located contiguous with the first reservoir 32. The receptacle 62 has a discharge outlet 63 in its sloping base 65.

Similarly, the motor 25 is typically coupled to and is adapted to drive a second conveying element 30', which extends through a second reservoir 32', essentially adjacent the first reservoir 32 and separated therefrom by mid wall 37, at the relatively lower end thereof adjacent its sloping base 33', which is provided with a plugged drain 35'. The second reservoir 32' is defined between two vertical compartmentalizing walls 34', 36' (such as extensions of walls 34, 36 respectively) each of which is appropriately pierced as at 38', 40' respectively to provide a mounting zone 39', 41' for the second conveying element 30'. The second conveying element 30' is held at each end thereof in a bushing 50', 51' providing a wiping seal to give a tight fit for the drive end and the discharge end of the element. The bushings 50', 51' are held in a mounting block 52', 54' respectively each of which is adjustable through the agency of a pin and slot arrangement 56' or the like securable in position by the application of pressure provided by wing-nuts 60' or the like. The receptacle 62 for also the reception in use of dosages of a second substance delivered by the second conveying element 30 through the outlet bushing 51' is located contiguous with the second reservoir 32'.

The first 30 and second 30' conveying elements are each typically in the form of an auger with a scrolled flight 31, 31' which in use serves to move and thus convey the first and second substances within the first 32 and second 32' reservoirs through the outlets 40, 40' to the receptacle 62.

Typically, the motor 25 is coupled to the first 30 and second 30' conveying elements via a coupling mechanism 70 which includes a gear box 72 coupled to respective first 74 and second 74' free wheel sprockets allowing operation of the first 30 and second 30' conveyor elements upon the motor 25 being operated into first and second rotational directions, respectively, as illustrated in FIG. 3.

Figure 4:
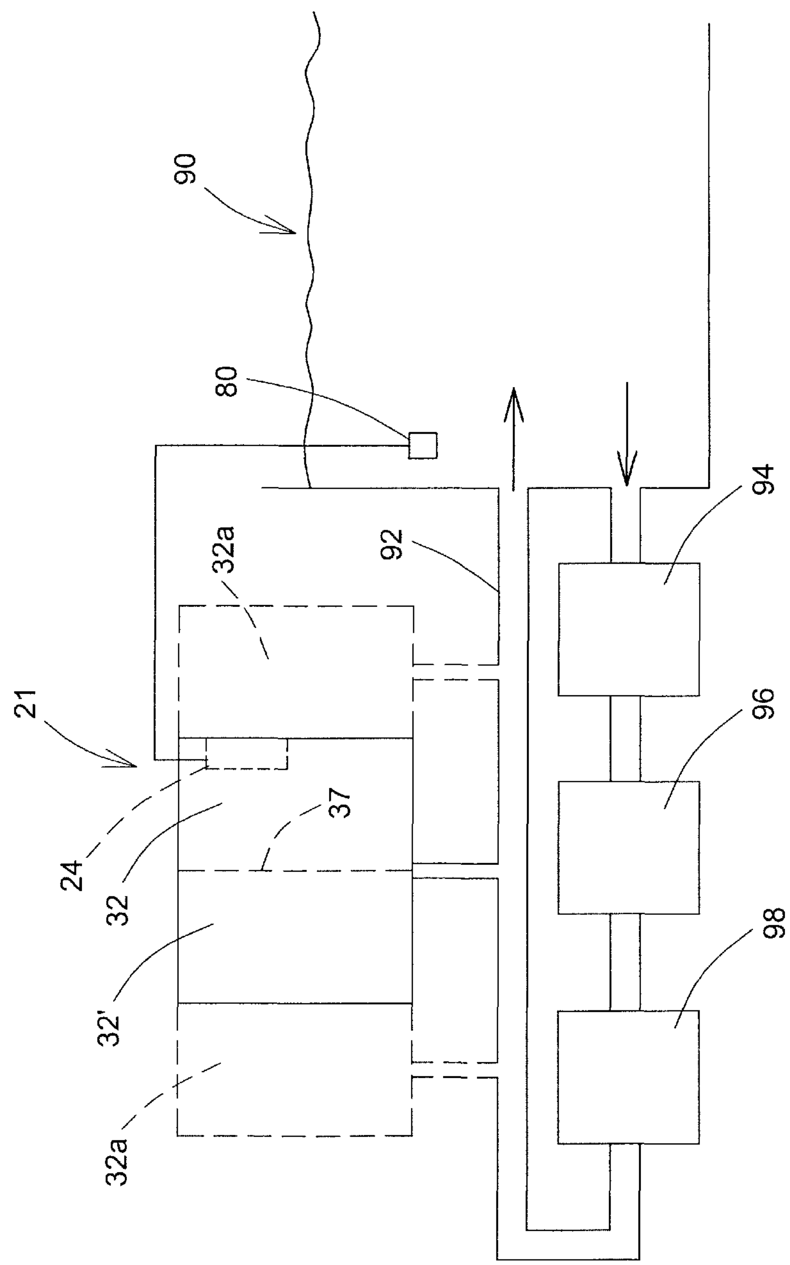

As shown in FIG. 4, the apparatus 21 can include at least one sensor unit 80 connected to the controller unit 24 for sensing a corresponding actual parameter level of a fluid, as water in a spa 90 or the like, being in fluid communication with the discharge outlet 63 along a fluid circulation conduit 92 including usual fluid pump 94, filter 96, and heater 98.

In operation, first and second substances in discrete form, for example powder or granules, could be held in hoppers 6 and gravitationally feed through the tubes 5 into the reservoirs 32, 32' where the substances are supported by the sloping bases 33, 33' and between the walls 34, 36 and 34', 36'. Actuation of the motor 25, in either rotational direction, in accordance with a programmed dosing regime on a temporal basis, e.g. g/min, g/hr, is instigated with the result that the corresponding conveying element 30, 30' rotates and in so doing its flight 31, 31' picks up the corresponding substance and scrolls it towards the outlet bushing 51, 51'. It will be understood by the skilled addressee that since the auger lies and rotates within the body of the substance in the corresponding reservoir 32, 32', the outer surface of the flight 31, 31' is in contact with that substance and may attract particles which are carried thereby towards the outlet bushing 51, 51'. However, in view of the tight fit of the discharge end of the conveying element 30, 30' within its bushing 51, 51', the particles so attracted are in effect barred from entering the outlet bushing 51, 51' and thus the predetermined dosage maintains its accuracy since it is not contaminated by inadvertent carriage of particle adhering to the outer surface of the scroll flight 31, 31'.

The substance discharged through the outlet bushing 51, 51' descends as illustrated in FIG. 3 into the receptacle 62 onto the sloping base 65 and falls through the discharge outlet 63 for predestined use in a relevant process which could be for example chemical or pharmaceutical in character, such as the two substances being an acid and a base substance used to control the acidity or pH level of a fluid (as the water of a spa or the like), since at each time, either one of the two substances need to be fed.

To this end, the controller unit 24, upon the actual parameter sensed from the sensor unit 80 being smaller or larger than a predetermined parameter level, operates the motor 25 into the first or second rotational direction, respectively, for feeding of the first or second substances into the fluid. Similarly, the controller unit 24, depending on a difference between the actual and predetermined parameter levels, operates the motor 25 into the first or second rotational direction for a calculated time duration, or a calculated rotational angle of the conveying element 30, 30' to ensure the predetermined dosage of the first or second substance is fed into the fluid.

Although the feeding/dosing apparatus could be deployed for the controlled feeding of animals and such application may be particularly useful for intensive farming, where regular and closely monitored and accurate feeding of the animals is necessary, similarly to the feeding of chemical nature as for the acidity level control of the water of a spa, swimming pool or the like. The programming of the motor operation may not only dictate the volume of the feed, but also the duration and number of times the motor is actuated.

Although not illustrated herein, it would be obvious to one skilled in the art, without departing from the scope of the present invention, to have one motor 25, 25' per conveying element 30, 30'. Similarly, the two reservoirs 32, 32', instead of being positioned side-to-side (as shown), they could be positioned back-to-back with the two conveying elements 30, 30' being co-axial relative to one another, or even being a same element, but having reverse threads or flights 31, 31' such that, depending on the rotational direction of the conveying element 30, 30', either one of the first and second substances is fed. In such a case, when precise feeding is required, the controller unit 24 may have to account for an additional rotational angle due to a 'reset' of the corresponding feeding element (before it will actually start delivering the corresponding substance) when the previous feeding was for the other substance (in the reverse rotational direction which induced a back-off of the substance ready for being delivered).

Although partially illustrated in FIG. 1 in stippled lines, more than the two reservoirs 32, 32' can be considered without departing the scope of the present invention. Each of these additional reservoirs 32*a*, for example, has its own conveying element with its drive motor for feeding a corresponding substance into the fluid. Additional corresponding sensors, sensing respective parameters of the fluid, connected to the controller unit 24 could determine the need to feed the corresponding substance, and the specific required amount thereof, into the fluid.

Although the present invention of a multi-reservoir feeding/dosing apparatus has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

The invention claimed is:

1. A feeding apparatus for feeding at least first and second substances in discrete particulate form, the feeding apparatus comprising:

- a first reservoir for receiving the first substance therein and having an inlet for the introduction of the first substance thereto and a first outlet for the egress of the first substance therefrom, a first conveying element having an inlet end and a discharge end, each end being mounted in a respective bushing and the first conveying element extending through the first reservoir and adapted to convey the first substance in predetermined dosages from the first reservoir to the first outlet thereof for delivery therefrom;
- a second reservoir for receiving the second substance therein and having an inlet for the introduction of the second substance thereto and a second outlet for the egress of the second substance therefrom, a second conveying element having an inlet end and a discharge end, each end being mounted in a respective bushing and the second conveying element extending through the second reservoir and adapted to convey the second substance in predetermined dosages from the second reservoir to the second outlet thereof for delivery therefrom;
- at least one motor operatively connected to the first and second conveying elements; and
- a controller unit operatively connecting to the at least one motor to drive the first and second conveying elements upon rotation into first and second rotational directions, respectively; and
- a sensor unit connecting to the controller unit for sensing an actual parameter level of a fluid, and the first and second outlets being in fluid communication with the fluid, and wherein the controller unit, upon the actual parameter being smaller or larger than a predetermined parameter level, operates the at least one motor into the first and second rotational directions, respectively, for feeding of the first and second substances into the fluid.

2. A feeding apparatus as claimed in claim 1, wherein the at least one motor operatively connects to the first and second conveying elements via a coupling mechanism.

3. A feeding apparatus as claimed in claim 2, wherein the coupling mechanism includes respective first and second free wheel sprockets allowing operation of the first and second conveyor elements upon the at least one motor being operated into the first and second rotational directions, respectively.

4. A feeding apparatus as claimed in claim 2, the controller unit, depending on a difference between the actual and predetermined parameter levels, operates the at least one motor into the first or second rotational direction for a calculated time duration to ensure the predetermined dosage of the first or second substance into the fluid.

5. A feeding apparatus for feeding at least first and second substances in discrete particulate form, the feeding apparatus comprising:

- a first reservoir for receiving the first substance therein and having an inlet for the introduction of the first substance thereto and a first outlet for the egress of the first substance therefrom, a first conveying element having an inlet end and a discharge end, each end being mounted in a respective bushing and the first conveying element extending through the first reservoir and adapted to convey the first substance in predetermined dosages from the first reservoir to the first outlet thereof for delivery therefrom;
- a second reservoir for receiving the second substance therein and having an inlet for the introduction of the second substance thereto and a second outlet for the egress of the second substance therefrom, a second conveying element having an inlet end and a discharge end, each end being mounted in a respective bushing and the second conveying element extending through the second reservoir and adapted to convey the second substance in predetermined dosages from the second reservoir to the second outlet thereof for delivery therefrom;

at least one motor operatively connected to the first and second conveying elements; and a controller unit operatively connecting to the at least one motor to drive the first and second conveying elements upon rotation into first and second rotational directions, respectively;

wherein the at least one motor includes first and second motors operating the first and second conveying elements, respectively.

* * * * *